United States Patent
Campbell et al.

(10) Patent No.: US 6,182,469 B1
(45) Date of Patent: Feb. 6, 2001

(54) HYDROCARBON GAS PROCESSING

(75) Inventors: Roy E. Campbell, deceased, late of Midland, by Wanda P. Campbell, executrix; John D. Wilkinson; Hank M. Hudson, both of Midland; Michael C. Pierce, Odessa, all of TX (US)

(73) Assignee: Elcor Corporation, Dallas, TX (US)

( * ) Notice: Under 35 U.S.C. 154(b), the term of this patent shall be extended for 0 days.

(21) Appl. No.: 09/439,508

(22) Filed: Nov. 12, 1999

Related U.S. Application Data

(60) Provisional application No. 60/110,502, filed on Dec. 1, 1998.

(51) Int. Cl.⁷ .................................................. F25J 3/02
(52) U.S. Cl. .............................................. 62/621; 62/625
(58) Field of Search ...................................... 62/621, 625

(56) References Cited

U.S. PATENT DOCUMENTS

| | | | |
|---|---|---|---|
| Re. 33,408 | 10/1990 | Khan et al. ................... | 62/29 |
| 4,157,904 | 6/1979 | Campbell et al. ............ | 62/27 |
| 4,171,964 | 10/1979 | Campbell et al. ............ | 62/24 |
| 4,185,978 | 1/1980 | McGalliard et al. .......... | 62/28 |
| 4,251,249 | 2/1981 | Gulsby .......................... | 62/28 |
| 4,278,457 | 7/1981 | Campbell et al. ............ | 62/24 |
| 4,519,824 | 5/1985 | Huebel .......................... | 62/26 |
| 4,617,039 | 10/1986 | Buck ............................. | 62/26 |
| 4,687,499 | 8/1987 | Aghili ........................... | 62/24 |
| 4,689,063 | 8/1987 | Paradowski et al. ......... | 62/28 |
| 4,690,702 | 9/1987 | Paradowski et al. ......... | 62/23 |
| 4,710,214 * | 12/1987 | Sharma et al. ............... | 62/621 |
| 4,854,955 | 8/1989 | Campbell et al. ............ | 62/24 |
| 4,869,740 | 9/1989 | Campbell et al. ............ | 62/24 |
| 4,889,545 | 12/1989 | Campbell et al. ............ | 62/24 |
| 4,895,584 * | 1/1990 | Buck et al. ................... | 62/621 |
| 5,275,005 | 1/1994 | Campbell et al. ............ | 62/24 |
| 5,555,748 | 9/1996 | Campbell et al. ............ | 62/621 |
| 5,566,554 * | 10/1996 | VijayaraGhavan et al. ... | 62/621 |
| 5,568,737 | 10/1996 | Campbell et al. ............ | 62/621 |
| 5,771,712 | 6/1998 | Campbell et al. ............ | 62/621 |
| 5,799,507 | 9/1998 | Wilkinson et al. ........... | 62/621 |
| 5,881,569 | 3/1999 | Campbell et al. ............ | 62/621 |
| 5,890,378 | 4/1999 | Rambo et al. ................ | 62/621 |
| 5,983,664 | 11/1999 | Campbell et al. ............ | 62/621 |

* cited by examiner

Primary Examiner—Ronald Capossela
(74) Attorney, Agent, or Firm—Baker Botts LLP

(57) ABSTRACT

A process for the recovery of ethane, ethylene, propane, propylene and heavier hydrocarbon components from a hydrocarbon gas stream is disclosed. In recent years, the preferred method of separating a hydrocarbon gas stream generally includes supplying at least portions of the gas stream to a fractionation tower having at least one reboiler, and often one or more side reboilers, to supply heat to the column by withdrawing and heating some of the tower liquids to produce stripping vapors that separate the more volatile components from the desired components. The reboiler and side reboilers (if any) are typically integrated into the feed stream cooling scheme to provide at least a portion of the refrigeration needed to condense the desired components for subsequent fractionation in the distillation column. In the process disclosed, the tower reboiling scheme is modified to use one or more tower liquid distillation streams from a point higher in the column than is used in the conventional reboiling scheme, providing colder stream(s) for the reboiler(s) that allow more effective cooling of the feed streams and thereby improve the efficiency with which the desired components are recovered. In addition, the tower liquid streams withdrawn from a higher point in the column contain larger quantities of the more volatile components, which when vaporized provide better stripping of undesirable components like carbon dioxide without reducing the recovery of the desired components. The heated distillation stream is returned to a lower point on the fractionation tower that is separated from the withdrawal point by at least one theoretical stage.

13 Claims, 9 Drawing Sheets

HYDROCARBON GAS PROCESSING

BACKGROUND OF THE INVENTION

This invention relates to a process for the separation of a gas containing hydrocarbons. The applicants claim the benefits under Title 35, United States Code, Section 119(e) of prior United States provisional application Serial No. 60/110,502 which was filed on Dec. 1, 1998.

Ethylene, ethane, propylene, propane and/or heavier hydrocarbons can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, i.e., methane and ethane together comprise at least 50 mole percent of the gas. The gas also contains relatively lesser amounts of heavier hydrocarbons such as propane, butanes, pentanes and the like, as well as hydrogen, nitrogen, carbon dioxide and other gases.

The present invention is generally concerned with the recovery of ethylene, ethane, propylene, propane and heavier hydrocarbons from such gas streams. A typical analysis of a gas stream to be processed in accordance with this invention would be, in approximate mole percent, 92.12% methane, 3.96% ethane and other $C_2$ components, 1.05% propane and other $C_3$ components, 0.15% iso-butane, 0.21% normal butane, 0.11% pentanes plus, with the balance made up of nitrogen and carbon dioxide. Sulfur containing gases are also sometimes present.

The historically cyclic fluctuations in the prices of both natural gas and its natural gas liquid (NGL) constituents have at times reduced the incremental value of ethane, ethylene, propane, propylene, and heavier components as liquid products. Competition for processing rights has forced plant operators to maximize the processing capacity and recovery efficiency of their existing gas processing plants. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas being processed. Depending upon the pressure of the gas source, the richness (ethane, ethylene, and heavier hydrocarbons content) of the gas, and the desired end products, each of these processes or a combination thereof may be employed.

The cryogenic expansion process is now generally preferred for natural gas liquids recovery because it provides maximum simplicity with ease of start up, operating flexibility, good efficiency, safety, and good reliability. U.S. Pat. Nos. 4,157,904; 4,171,964; 4,185,978; 4,251,249; 4,278,457; 4,519,824; 4,617,039; 4,687,499; 4,689,063; 4,690,702; 4,854,955; 4,869,740; 4,889,545; 5,275,005; 5,555,748; 5,568,737; 5,771,712; 5,799,507; 5,881,569; 5,890,378; reissue 32141-60/110,502 U.S. Pat. No. 33,408; and co-pending application no. 09/054,802 now U.S. Pat. No. 5,983,664 describe relevant processes (although the description of the present invention in some cases is based on different processing conditions than those described in the cited U.S. patents and patent applications).

In a typical cryogenic expansion recovery process, a feed gas stream under pressure is cooled by heat exchange with other streams of the process and/or external sources of refrigeration such as a propane compression-refrigeration system. As the gas is cooled, liquids may be condensed and collected in one or more separators as high-pressure liquids containing some of the desired $C_2$+ components. Depending on the richness of the gas and the amount of liquids formed, the high-pressure liquids may be expanded to a lower pressure and fractionated. The vaporization occurring during expansion of the liquids results in further cooling of the stream. Under some conditions, pre-cooling the high pressure liquids prior to the expansion may be desirable in order to further lower the temperature resulting from the expansion. The expanded stream, comprising a mixture of liquid and vapor, is fractionated in a distillation (demethanizer) column. In the column, the expansion cooled stream(s) is (are) distilled to separate residual methane, nitrogen, and other volatile gases as overhead vapor from the desired $C_2$ components, $C_3$ components, and heavier hydrocarbon components as bottom liquid product.

If the feed gas is not totally condensed (typically it is not), at least a portion of the vapor remaining from the partial condensation can be passed through a work expansion machine or engine, or an expansion valve, to a lower pressure at which additional liquids are condensed as a result of further cooling of the stream. The pressure after expansion is essentially the same as the pressure at which the distillation column is operated. The combined vapor-liquid phases resulting from the expansion are supplied as a feed to the column. In recent years, the preferred processes for hydrocarbon separation involve feeding this expanded vapor-liquid stream at a mid-column feed point, with an upper absorber section providing additional rectification of the vapor phase.

The source of the reflux stream for the upper rectification section is typically a portion of the above mentioned vapor remaining after partial condensation of the feed gas, but withdrawn prior to work expansion. An alternate source for the upper reflux stream may be provided by a recycled stream of residue gas supplied under pressure. Regardless of its source, this vapor stream is usually cooled to substantial condensation by heat exchange with other process streams, e.g., the cold fractionation tower overhead. Some or all of the high-pressure liquid resulting from partial condensation of the feed gas may be combined with this vapor stream prior to cooling. The resulting substantially condensed stream is then expanded through an appropriate expansion device, such as an expansion valve, to the pressure at which the demethanizer is operated. During expansion, a portion of the liquid will usually vaporize, resulting in cooling of the total stream. The flash expanded stream is then supplied as top feed to the demethanizer. Typically, the vapor portion of the expanded stream and the demethanizer overhead vapor combine in an upper separator section in the fractionation tower as residual methane product gas. Alternatively, the cooled and expanded stream may be supplied to a separator to provide vapor and liquid streams, so that thereafter the vapor is combined with the tower overhead and the liquid is supplied to the column as a top column feed.

The purpose of this process is to perform a separation that produces a residue gas leaving the process which contains substantially all of the methane in the feed gas with essentially none of the $C_2$ components and heavier hydrocarbon components, and a bottoms fraction leaving the demethanizer which contains substantially all of the $C_2$ components and heavier hydrocarbon components with essentially no methane or more volatile components while meeting plant specifications for maximum permissible carbon dioxide content. The present invention provides a means for providing a new plant or modifying an existing processing plant to achieve this separation at significantly lower capital cost by reducing the size of or eliminating the need for a product treating system for removal of carbon dioxide. Alternatively, the present invention, whether applied in a new facility or as a modification to an existing processing plant, can be used to recover more $C_2$ components and heavier hydrocarbon components in the bottom liquid product for a given carbon dioxide concentration in the feed gas than other processing schemes.

In accordance with the present invention, it has been found that $C_2$ recoveries in excess of 84 percent can be maintained while maintaining the carbon dioxide content of the bottom liquid product within specifications and providing essentially complete rejection of methane to the residue gas stream. The present invention, although applicable at lower pressures and warmer temperatures, is particularly advantageous when processing feed gases at pressures in the range of 600 to 1000 psia or higher under conditions requiring column overhead temperatures of −120° F. or colder.

The present invention uses a modified reboiler scheme which can be applied to any type of NGL recovery system. In a typical reboiler or side reboiler application in a distillation column, the entire column down-flowing liquid stream is withdrawn from the tower and passed through a heat exchanger, then returned to the column at essentially the same point in the column. In this modified reboiler system, a portion of the column down-flowing liquid is withdrawn from a point higher in the column, i.e., separated from the return point by at least one theoretical stage. Even though the flow rate of the liquid may be lower, it is usually much colder and can have advantages in improving recovery or reducing exchanger size.

It has been found that when the present invention is applied to prior art processes for NGL recovery, the recovery of $C_2$ components and heavier components is improved by one to two percent. The improvement in recovery is much greater, however, when it is desirable to reduce the carbon dioxide content in the recovered NGL product. Recovery of ethane in a typical NGL recovery plant also results in recovery of at least some of the carbon dioxide contained in the feed gas because carbon dioxide falls in between methane and ethane in relative volatility. Therefore, as ethane recovery increases, so does the recovery of carbon dioxide in the NGL product. By applying the modified reboiler scheme of the present invention, the applicants have found that it is possible to significantly improve recovery of ethane in the NGL product compared to use of the conventional reboiler or side reboiler systems when the column is reboiled to meet the desired carbon dioxide content in the NGL product.

For a better understanding of the present invention, reference is made to the following examples and drawings. Referring to the drawings.

In the following explanation of the above figures, tables are provided summarizing flow rates calculated for representative process conditions. In the tables appearing herein, the values for flow rates (in pound moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

DESCRIPTION OF THE PRIOR ART

Figure 1:
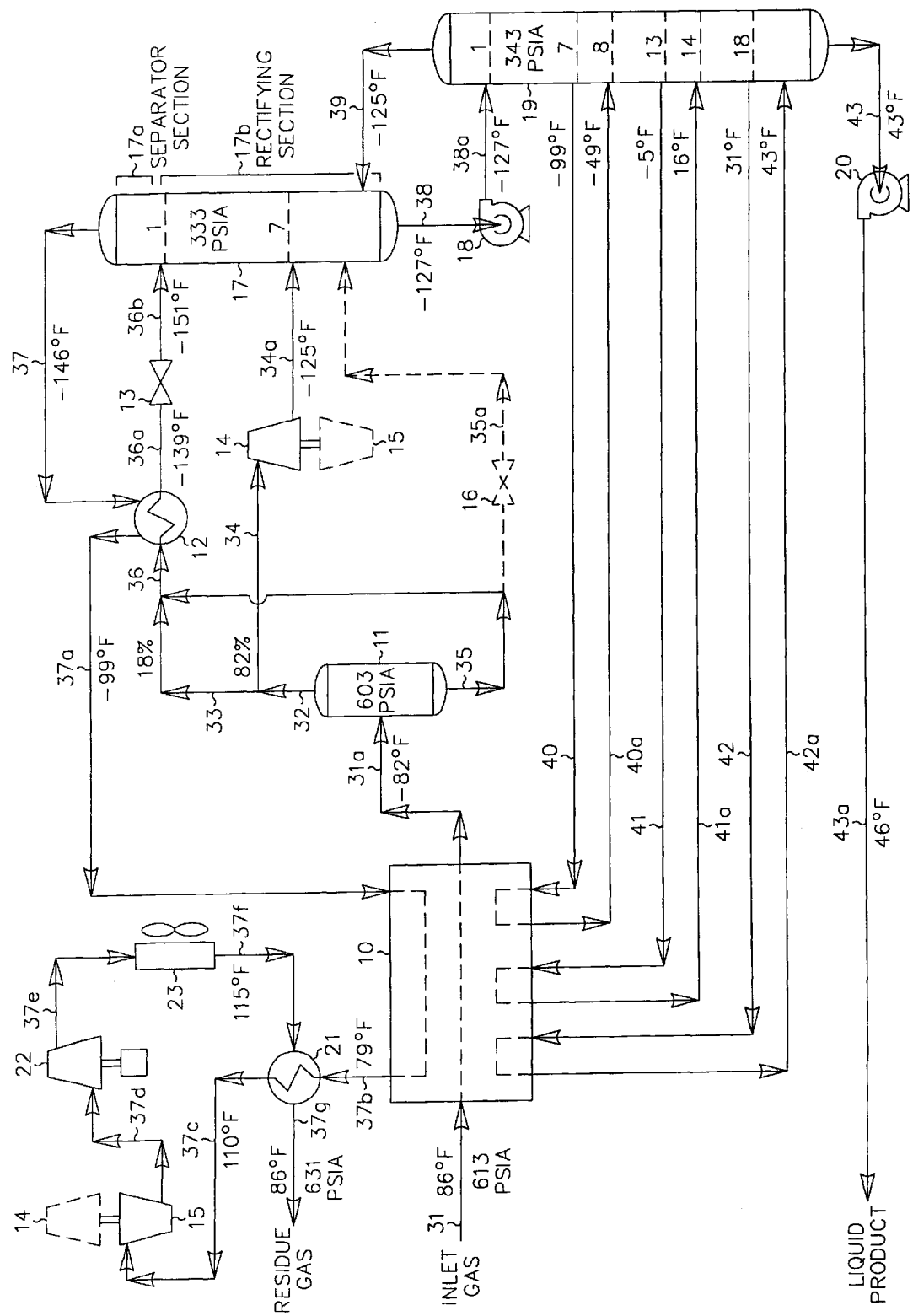
FIG. 1 is a flow diagram of a prior art cryogenic natural gas processing plant.

FIG. 1 is a process flow diagram showing the design of a processing plant to recover $C_2$+ components from natural gas using prior art according to U.S. Pat. No. 4,157,904. Because this is a large plant designed for 1.0 billion cubic feet of feed gas per day, the demethanizer (fractionation tower) is to be constructed in two sections, absorber column 17 and stripper column 19. In this simulation of the process, inlet gas enters the plant at 86° F. and 613 psia as stream 31. If the inlet gas contains a concentration of sulfur compounds which would prevent the product streams from meeting specifications, the sulfur compounds are removed by appropriate pretreatment of the feed gas (not illustrated). In addition, the feed stream is usually dehydrated to prevent hydrate (ice) formation under cryogenic conditions. Solid desiccant has typically been used for this purpose.

The feed stream 31 is cooled in exchanger 10 by heat exchange with cool residue gas at −99° F. (stream 37a), demethanizer reboiler liquids at 31 ° F. (stream 42), demethanizer lower side reboiler liquids at −5° F. (stream 41) and demethanizer upper side reboiler liquids at −99° F. (stream 40). Note that in all cases exchanger 10 is representative of either a multitude of individual heat exchangers or a single multi-pass heat exchanger, or any combination thereof. (The decision as to whether to use more than one heat exchanger for the indicated cooling services will depend on a number of factors including, but not limited to, inlet gas flow rate, heat exchanger size, stream temperatures, etc.) The cooled stream 31a enters separator 11 at −82° F. and 603 psia where the vapor (stream 32) is separated from the condensed liquid (stream 35).

The vapor (stream 32) from separator 11 is divided into two streams, 33 and 34. Stream 33, containing about 18 percent of the total vapor, is combined with the condensed liquid from separator 11. The combined stream 36 passes through heat exchanger 12 in heat exchange relation with the demethanizer overhead vapor stream 37 resulting in cooling and substantial condensation of the stream. The substantially condensed stream 36a at −139° F. is then flash expanded through an appropriate expansion device, such as expansion valve 13, to the operating pressure (approximately 333 psia) of absorber column 17 of the fractionation tower. During expansion a portion of the stream is vaporized, resulting in cooling of the total stream. In the process illustrated in FIG. 1, the expanded stream 36b leaving expansion valve 13 reaches a temperature of −151° F. and is supplied to separator section 17a in the upper region of absorber tower 17. The liquids separated therein become the top feed to theoretical stage 1 in rectifying section 17b. (An alternative routing for the separator liquid (stream 35) in accordance with U.S. Pat. No. 4,278,457 is indicated by a dashed line whereby at least a portion of the liquid is expanded to approximately 333 psia by expansion valve 16, cooling stream 35 to produce stream 35a that is then supplied to the rectifying section in absorber tower 17 at a bottom feed point or to stripper tower 19 at an upper feed point.)

The remaining 82 percent of the vapor from separator 11 (stream 34) enters a work expansion machine 14 in which mechanical energy is extracted from this portion of the high pressure feed. The machine 14 expands the vapor substantially isentropically from a pressure of about 603 psia to a pressure of about 333 psia, with the work expansion cooling the expanded stream 34a to a temperature of approximately −125° F. The typical commercially available expanders are capable of recovering on the order of 80–85% of the work theoretically available in an ideal isentropic expansion. The work recovered is often used to drive a centrifugal compressor (such as item 15), that can be used to re-compress the residue gas (stream 37c), for example. The expanded and partially condensed stream 34a is supplied as feed to the distillation column at a lower feed point (below theoretical stage 7 in this case).

The liquids (stream 38) from the bottom of absorber column 17 at −127° F. are supplied by pump 18 to stripper column 19 at a top feed point (stream 38a). The operating pressure of stripper column 19 (343 psia) is slightly higher than the operating pressure of absorber column 17 so that the pressure difference between the two towers provides the motive force for the overhead vapors (stream 39) at −125° F. from the top of stripper column 19 to flow to the bottom feed point on absorber column 17.

The demethanizer in absorber tower 17 and stripper tower 19 is a conventional distillation column containing a plurality of vertically spaced trays, one or more packed beds, or some combination of trays and packing. As is often the case in natural gas processing plants, the absorber tower may consist of two sections. The upper section 17a is a separator wherein the partially vaporized top feed is divided into its respective vapor and liquid portions, and wherein the vapor rising from the lower distillation or rectifying section 17b is combined with the vapor portion (if any) of the top feed to form the cold residue gas distillation stream 37 which exits the top of the tower. The lower, rectifying section 17b and the stripper column 19 contain the trays and/or packing and provide the necessary contact between the liquids falling downward and the vapors rising upward. The stripper column 19 also includes reboilers which heat and vaporize portions of the liquids flowing down the column to provide the stripping vapors which flow up the column.

The liquid product (stream 43) exits the bottom of the tower at 43° F., based on a typical specification of a methane to ethane ratio of 0.0237:1 on a molar basis in the bottom product and is pumped to approximately 550 psia (stream 43a) in pump 20. (The discharge pressure of the pump is usually set by the ultimate destination of the liquid product. Generally the liquid product flows to storage and the pump discharge pressure is set so as to prevent any vaporization of stream 43a as it warms to ambient temperature.)

The residue gas (stream 37) passes countercurrently to the incoming feed gas in: (a) heat exchanger 12 where it is heated to −99° F. (stream 37a), (b) heat exchanger 10 where it is heated to 79° F. (stream 37b), and (c) heat exchanger 21 where it is heated to 110° F. (stream 37c). The residue gas is then re-compressed in two stages. The first stage is compressor 15 driven by expansion machine 14, and the second stage is compressor 22 driven by a supplemental power source. After stream 37e is cooled to 115° F. (stream 37f) by cooler 23 and to 86° F. by heat exchanger 21, the residue gas product (stream 37g) flows to the sales pipeline at 631 psia, sufficient to meet line requirements (usually on the order of the inlet pressure).

A summary of stream flow rates and energy consumption for the process illustrated in FIG. 1 is set forth in the following table:

TABLE 1

(FIG. 1)
Stream Flow Summary - (Lb. Moles/Hr)

| Stream | Methane | Ethane | Propane | Butanes+ | C. Dioxide | Total |
|---|---|---|---|---|---|---|
| 31 | 121383 | 5218 | 1384 | 619 | 1054 | 131766 |
| 32 | 118997 | 4514 | 817 | 147 | 990 | 127561 |
| 35 | 2386 | 704 | 567 | 472 | 64 | 4205 |
| 33 | 22015 | 835 | 151 | 27 | 183 | 23599 |
| 34 | 96982 | 3679 | 666 | 120 | 807 | 103962 |
| 38 | 11021 | 4734 | 1353 | 616 | 462 | 18222 |
| 39 | 10916 | 304 | 12 | 1 | 90 | 11359 |
| 40 | 6568 | 6227 | 1444 | 625 | 891 | 15755 |
| 37 | 121278 | 788 | 43 | 4 | 682 | 124903 |
| 43 | 105 | 4430 | 1341 | 615 | 372 | 6863 |

Recoveries*

| | |
|---|---|
| Ethane | 84.89% |
| Propane | 96.90% |
| Butanes+ | 99.33% |

Horsepower

| | |
|---|---|
| Residue Compression | 44,408 |

*(Based on un-rounded flow rates)

As shown in Table I, the prior art illustrated in FIG. 1 achieves 84.89% ethane recovery using the available residue compression horsepower (45,000 HP maximum). However, the carbon dioxide concentration in the ethane product (the methane, ethane, and carbon dioxide stream that results when the bottoms liquid product is subsequently fractionated to separate the $C_2$ components and lighter components from the $C_3$ components and heavier hydrocarbon components) is 7.59 mole percent, which exceeds the plant owner's specification of 6.0 mole percent maximum. Thus, this plant design would require the addition of a treating system to remove carbon dioxide from the hydrocarbons in order to produce a marketable liquid product. There are many options for removing the carbon dioxide (treating the incoming feed gas, treating the total liquid product, treating the ethane product after fractionation, etc.), but all of these options will add not only to the capital cost of the plant (due to the cost of installing the treating system) but also to the operating expense of the plant (due to energy and chemical consumption in the treating system).

Figure 2:
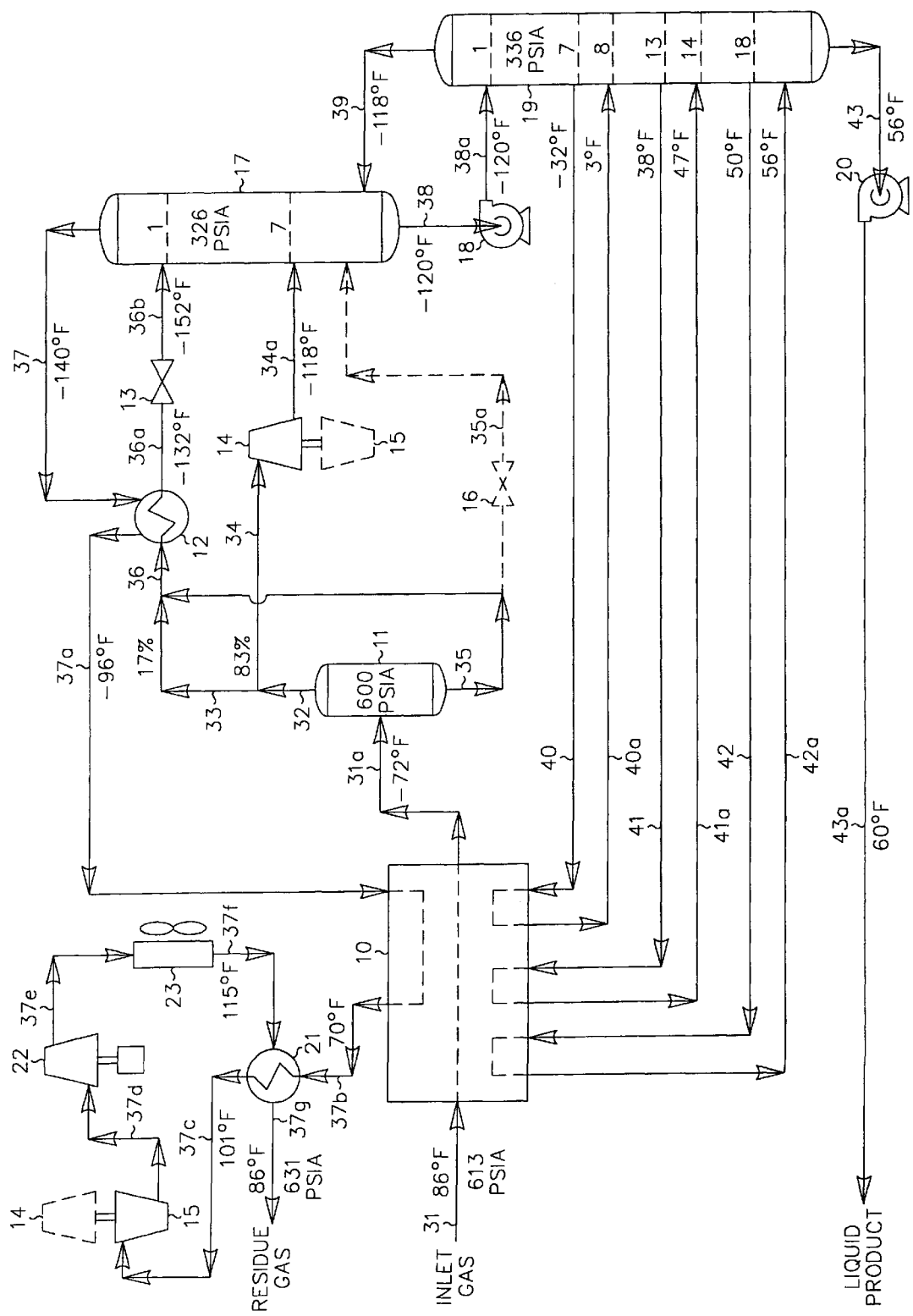
FIG. 2 is a flow diagram of an alternative adaptation of the prior art cryogenic natural gas processing plant.

One way to keep the ethane product within the carbon dioxide specification is to operate the demethanizer in a manner to strip the carbon dioxide from the bottom liquid product, by adding more reboil heat to the column using the side reboilers and/or the bottom reboiler. FIG. 2 represents such an alternative operating scheme for the process depicted in FIG. 1. The process of FIG. 2 has been applied to the same feed gas composition and conditions as described above for FIG. 1. However, in the simulation of the process of FIG. 2 the process operating conditions have been adjusted to control the bottom temperature of stripper column 19 such that the carbon dioxide content of the ethane product is within specification.

In the simulation of this process, as in the simulation for the process of FIG. 1, operating conditions were selected to keep the ethane recovery level as high as possible without exceeding the available residue gas compression horsepower. The feed stream 31 is cooled in exchanger 10 by heat exchange with cool residue gas at −96° F. (stream 37a), demethanizer reboiler liquids at 50° F. (stream 42), demethanizer lower side reboiler liquids at 38° F. (stream 41) and demethanizer upper side reboiler liquids at −32° F. (stream 40). The cooled stream 31a enters separator 11 at −72° F. and 600 psia where the vapor (stream 32) is separated from the condensed liquid (stream 35).

The vapor (stream 32) from separator 11 is divided into two streams, 33 and 34. Stream 33, containing about 17 percent of the total vapor, is combined with the condensed liquid from separator 11. The combined stream 36 passes through heat exchanger 12 in heat exchange relation with the demethanizer overhead vapor stream 37 resulting in cooling and substantial condensation of the stream. The substantially condensed stream 36a at −132° F. is then flash expanded through expansion valve 13. As the stream is expanded to the operating pressure of absorber column 17 (326 psia), it is cooled to a temperature of approximately −152° F. (stream 36b). The expanded stream 36b is supplied to the tower as the top feed.

The remaining 83 percent of the vapor from separator 11 (stream 34) enters work expansion machine 14 in which mechanical energy is extracted from this portion of the high pressure feed. The machine 14 expands the vapor substantially isentropically from a pressure of about 600 psia to the operating pressure of absorber tower 17 (326 psia), with the work expansion cooling the expanded stream 34a to a temperature of approximately −1 18° F. The expanded and partially condensed stream 34a is supplied as a feed to the distillation column at a lower feed point.

The liquids (stream 38) from the bottom of absorber column 17 at −120° F. are supplied by pump 18 to stripper column 19 at a top feed point (stream 38a). The operating pressure of stripper column 19 (336 psia) is slightly higher than the operating pressure of absorber column 17 so that the pressure difference between the two towers provides the motive force for the overhead vapors (stream 39) at −118° F. from the top of stripper column 19 to flow to the bottom feed point on absorber column 17.

The liquid product (stream 43) exits the bottom of tower 19 at 56° F. This stream is pumped to approximately 550 psia (stream 43a) in pump 20. The residue gas (stream 37) passes countercurrently to the incoming feed gas in: (a) heat exchanger 12 where it is heated to −96° F. (stream 37a), (b) heat exchanger 10 where it is heated to 70° F. (stream 37b), and (c) heat exchanger 21 where it is heated to 101° F. (stream 37c). The residue gas is then re-compressed in two stages, compressor 15 driven by expansion machine 14 and compressor 22 driven by a supplemental power source. After stream 37e is cooled to 115° F. (stream 37f) by cooler 23 and to 86° F. by heat exchange 21, the residue gas product (stream 37g) flows to the sales pipeline at 631 psia.

A summary of stream flow rates and energy consumption for the process illustrated in FIG. 2 is set forth in the following table:

TABLE II (FIG. 2)
Stream Flow Summary - (Lb. Moles/Hr)

| Stream | Methane | Ethane | Propane | Butanes+ | C. Dioxide | Total |
|---|---|---|---|---|---|---|
| 31 | 121383 | 5218 | 1384 | 619 | 1054 | 131766 |
| 32 | 120263 | 4857 | 1037 | 233 | 1023 | 129517 |
| 35 | 1120 | 361 | 347 | 386 | 31 | 2249 |
| 33 | 20745 | 838 | 179 | 40 | 176 | 22342 |
| 34 | 99518 | 4019 | 858 | 193 | 847 | 107175 |
| 38 | 6842 | 3841 | 1349 | 615 | 284 | 12953 |
| 39 | 6839 | 244 | 12 | 1 | 56 | 7174 |
| 40 | 1886 | 6752 | 1588 | 645 | 1377 | 12248 |
| 37 | 121380 | 1621 | 47 | 5 | 826 | 125987 |
| 43 | 3 | 3597 | 1337 | 614 | 228 | 5779 |

| Recoveries* | |
|---|---|
| Ethane | 68.94% |
| Propane | 96.61% |
| Butanes+ | 99.25% |
| Horsepower | |
| Residue Compression | 44,641 |

*(Based on un-rounded flow rates)

The carbon dioxide concentration in the ethane product for the FIG. 2 process is 5.95 mole percent, complying with the plant owner's specification of 6.0 mole percent maximum. Note, however, that the methane to ethane ratio in the bottom product is 0.0008:1 on a molar basis, versus the allowable ratio of 0.0237:1, indicating the degree of over-stripping required to control the carbon dioxide content of the liquid product at the required level. Comparison of the recovery levels displayed in Tables I and II shows that operating the FIG. 2 process in this manner to reduce the carbon dioxide content in the ethane product causes a substantial reduction in liquids recovery. The FIG. 2 process reduces ethane recovery from 84.89% to 68.94%, propane recovery from 96.90% to 96.61%, and butanes+ recovery from 99.33% to 99.25%.

There are two factors at work in the FIG. 2 process that result in less liquids recovery from the bottom of stripper tower 19 compared to the FIG. 1 process. First, when the temperature at the bottom of stripper column 19 is raised from 43° F. in the FIG. 1 process to 56° F. in the FIG. 2 process, the temperatures at each point in the column increase relative to their corresponding values in the FIG. 1 process. This reduces the amount of cooling that the tower liquid streams (streams 40, 41, and 42) can supply to the feed gas in heat exchanger 10. As a result, the cooled feed stream (stream 31a) entering separator 11 is warmer (−72° F. for the FIG. 2 process versus −82° F. for the FIG. 1 process), which in turn results in the lower ethane retention in absorber column 17 reflected by the ethane content of stream 38 (3841 Lb. Moles/Hr for the FIG. 2 process versus 4734 Lb. Moles/Hr for the FIG. 1 process). Second, the higher temperatures in stripper column 19 cause the temperatures in absorber column 17 to be higher, resulting in less methane liquid entering stripper column 19 (6842 Lb. Moles/Hr in stream 38 for the FIG. 2 process versus 11021 Lb. Moles/Hr for the FIG. 1 process). When this liquid methane is subsequently vaporized by the side reboilers and main reboiler attached to stripper column 19, the methane vapor helps to strip the carbon dioxide from the liquids flowing down the column. With less methane available in the FIG. 2 process to strip the carbon dioxide, more of the ethane in the liquids must be vaporized to serve as stripping gas. Since the relative volatilities for carbon dioxide and ethane are very similar, the ethane vapor is a much less effective stripping agent than the methane vapor, which reduces the stripping efficiency in the column.

DESCRIPTION OF THE INVENTION

EXAMPLE 1

Figure 3:
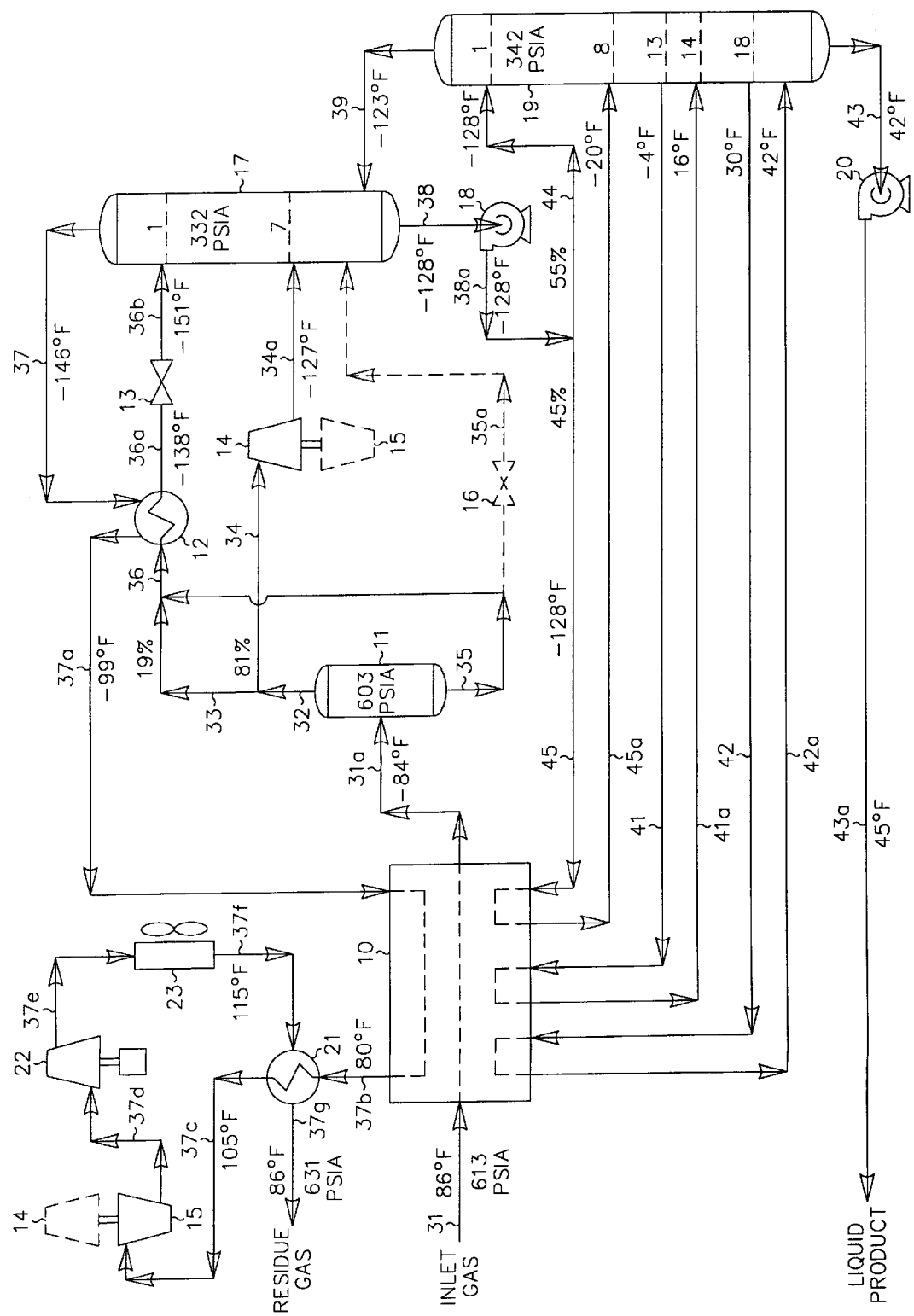
FIG. 3 is a flow diagram illustrating how the processing plants of FIGS. 1 and 2 can be adapted to be a natural gas processing plant in accordance with the present invention.

FIG. 3 illustrates a flow diagram of a process in accordance with the present invention. The feed gas composition and conditions considered in the process presented in FIG. 3 are the same as those in FIG. 1. Accordingly, the FIG. 3 process can be compared with that of the FIG. 1 process to illustrate the advantages of the present invention.

In the simulation of the FIG. 3 process, inlet gas enters at 86° F. and a pressure of 613 psia as stream 31. The feed stream 31 is cooled in exchanger 10 by heat exchange with cool residue gas at −99° F. (stream 37a), demethanizer reboiler liquids at 30° F. (stream 42), demethanizer side reboiler liquids at −4° F. (stream 41) and a portion of the liquids from the bottom of the absorber column at −128° F. (stream 45). The cooled stream 31a enters separator 11 at −84° F. and 603 psia where the vapor (stream 32) is separated from the condensed liquid (stream 35).

The vapor (stream 32) from separator 11 is divided into gaseous first and second streams, 33 and 34. Stream 33, containing about 19 percent of the total vapor, is combined with the condensed liquid (stream 35) to form stream 36. Combined stream 36 passes through heat exchanger 12 in heat exchange relation with the cold residue gas (stream 37) where it is cooled to −138° F. The resulting substantially condensed stream 36a is then flash expanded through an appropriate expansion device, such as expansion valve 13, to the operating pressure (approximately 332 psia) of absorber tower 17. During expansion a portion of the stream is vaporized, resulting in cooling of the total stream. In the process illustrated in FIG. 3, the expanded stream 36b leaving expansion valve 13 reaches a temperature of −51° F. and is supplied to absorber column 17 as the top column feed. The vapor portion (if any) of stream 36b combines with the vapors rising from the top fractionation stage of the column to form distillation stream 37, which is withdrawn from an upper region of the tower.

Returning to the gaseous second stream 34, the remaining 81 percent of the vapor from separator 11 enters a work expansion machine 14 in which mechanical energy is extracted from this portion of the high pressure feed. The machine 14 expands the vapor substantially isentropically from a pressure of about 603 psia to a pressure of about 332 psia, with the work expansion cooling the expanded stream 34a to a temperature of approximately −127° F. The expanded and partially condensed stream 34a is thereafter supplied as feed to absorber column 17 at a lower column feed point.

Alternatively as shown by the dashed line, the condensed liquid (stream 35) from separator 11 could be flash expanded through an appropriate expansion device, such as expansion valve 16, to the operating pressure of absorber tower 17, cooling stream 35 to produce stream 35a. The expanded stream 35a leaving expansion valve 16 could then be supplied to absorber tower 17 at a lower column feed point or to stripper tower 19 at an upper column feed point.

The liquids (stream 38) from the bottom of absorber column 17 enter pump 18 at −128° F. and are pumped to higher pressure (stream 38a) and divided into two portions. One portion (stream 44), containing about 55% of the total liquid, is supplied to stripper column 19 at a top feed point. The operating pressure of stripper column 19 (342 psia) is slightly higher than the operating pressure of absorber column 17 so that the pressure difference between the two towers provides the motive force for the overhead vapors (stream 39) at −123° F. from the top of stripper column 19 to flow to the bottom feed point on absorber column 17.

The other portion (stream 45), containing the remaining 45% of the pumped liquid stream 38a, is directed to heat exchanger 10 where it supplies part of the feed gas cooling as it is heated to −20° F. and partially vaporized. The heated stream 45a is thereafter supplied to stripper column 19 at a mid-column feed point, separated from the top feed point where stream 44 enters the column by at least one theoretical stage. In this case, the partially vaporized stream flows to the same point on the column that was used for the upper side reboiler return (theoretical stage 8 in stripper tower 19) in the FIG. 1 process, which is the equivalent of seven theoretical stages lower than the liquid stream withdrawal point in the fractionation system (the top feed point where stream 44 enters stripper column 19).

The liquid product (stream 43) exits the bottom of tower 19 at 42° F. This stream is pumped to approximately 550 psia (stream 43a) in pump 20. The residue gas (stream 37) passes countercurrently to the incoming feed gas in: (a) heat exchanger 12 where it is heated to −99° F. (stream 37a), (b) heat exchanger 10 where it is heated to 80° F. (stream 37b), and (c) heat exchanger 21 where it is heated to 105° F. (stream 37c). The residue gas is then re-compressed in two stages, compressor 15 driven by expansion machine 14 and compressor 22 driven by a supplemental power source. After stream 37e is cooled to 115° F. (stream 37f) by cooler 23 and to 86° F. by heat exchange 21, the residue gas product (stream 37g) flows to the sales pipeline at 631 psia.

A summary of stream flow rates and energy consumption for the process illustrated in FIG. 3 is set forth in the following table:

TABLE III (FIG. 3)
Stream Flow Summary - (Lb. Moles/Hr)

| Stream | Methane | Ethane | Propane | Butanes+ | C. Dioxide | Total |
|---|---|---|---|---|---|---|
| 31 | 121383 | 5218 | 1384 | 619 | 1054 | 131766 |
| 32 | 118694 | 4440 | 779 | 136 | 982 | 127126 |
| 35 | 2689 | 778 | 605 | 483 | 72 | 4640 |
| 33 | 22552 | 844 | 148 | 26 | 187 | 24154 |
| 34 | 96142 | 3596 | 631 | 110 | 795 | 102972 |
| 38 | 11906 | 4855 | 1357 | 616 | 557 | 19330 |
| 44 | 6548 | 2670 | 746 | 339 | 306 | 10632 |
| 45 | 5358 | 2185 | 611 | 277 | 251 | 8698 |
| 39 | 11800 | 362 | 13 | 1 | 156 | 12370 |
| 37 | 121277 | 725 | 40 | 4 | 653 | 124806 |
| 43 | 106 | 4493 | 1344 | 615 | 401 | 6960 |

Recoveries*

| | |
|---|---|
| Ethane | 86.12% |
| Propane | 97.10% |
| Butanes+ | 99.41% |
| Horsepower | |
| Residue Compression | 44,413 |

*(Based on un-rounded flow rates)

A comparison of Tables I and III shows that, compared to the prior art, the present invention improves ethane recovery from 84.89% to 86.12%, propane recovery from 96.90% to 97.10%, and butanes+ recovery from 99.33% to 99.41%. Comparison of Tables I and III further shows that the improvement in yields was achieved using equivalent horsepower (utility) requirements.

By using the modified reboiler approach, the column liquid flowing to heat exchanger 10 (stream 45) is colder than the corresponding stream 40 of the FIG. 1 process. This increases the cooling available to the inlet gas, because not only can considerably more duty be obtained from the liquids with this scheme, but the liquids are available at a colder temperature level than would be possible with a conventional reboiler scheme. The result is increased $C_2$+ component and heavier hydrocarbon component recoveries for the FIG. 3 process while using essentially the same amount of residue gas compression horsepower as the prior art FIG. 1 process.

EXAMPLE 2

Figure 4:
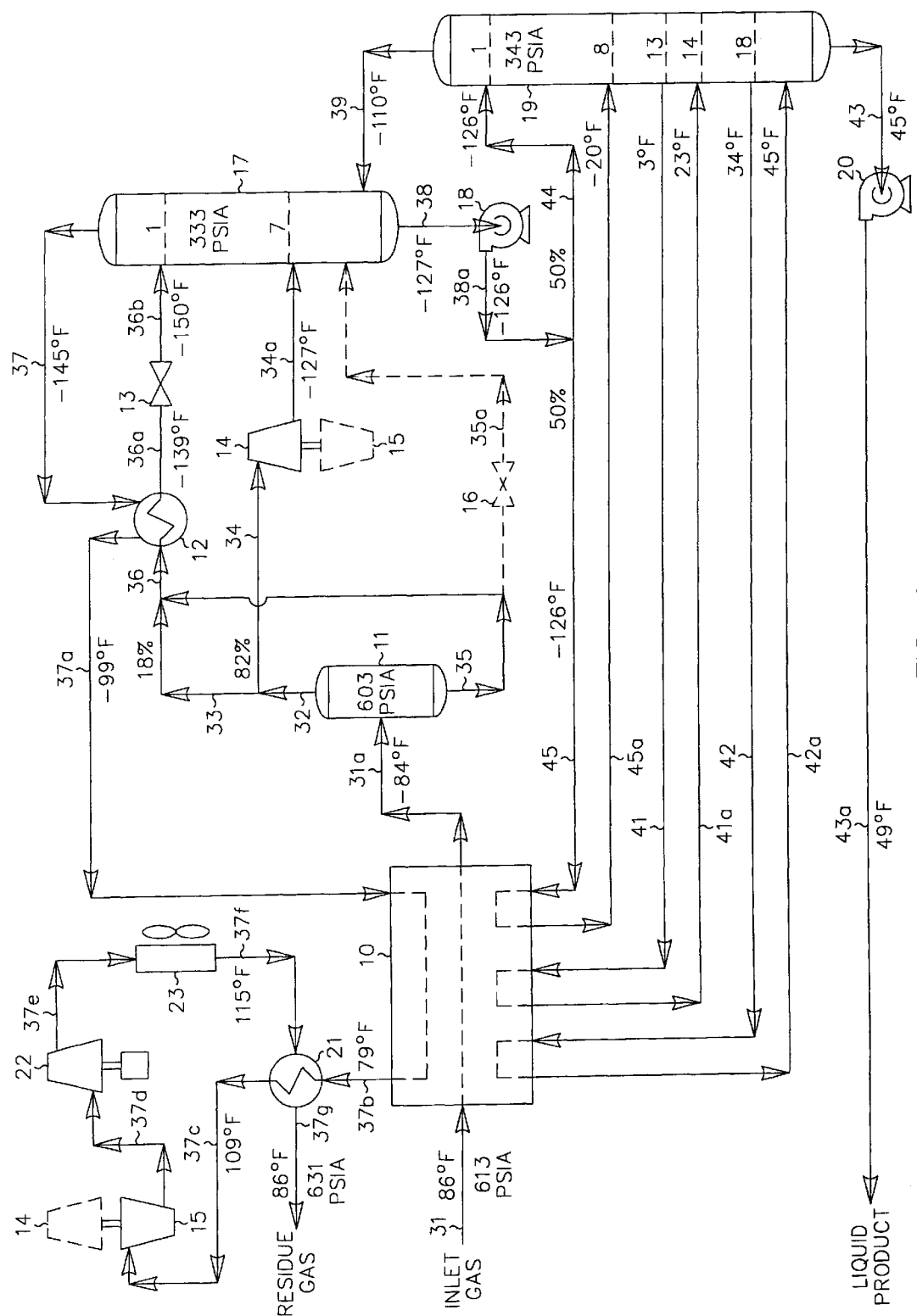
FIG. 4 is a flow diagram illustrating an alternative adaptation of FIGS. 1 and 2 to be a natural gas processing plant in accordance with the present invention.

In those cases where the carbon dioxide content of the liquid product is an issue (due to more stringent product specifications imposed by the client as in the FIG. 2 prior art process described previously, for instance), the present invention offers very significant recovery and efficiency advantages over the prior art process depicted in FIG. 2. The operating conditions of the FIG. 3 process can be altered to reduce the carbon dioxide content in the liquid product of the present invention as illustrated in FIG. 4. The feed gas composition and conditions considered in the process presented in FIG. 4 are the same as those in FIGS. 1 and 2. Accordingly, the FIG. 4 process can be compared with that of the FIGS. 1 and 2 processes to illustrate the advantages of the present invention.

In the simulation of the FIG. 4 process, the inlet gas cooling and separation scheme is essentially the same as that used in FIG. 3. The main difference is that the plant controls have been adjusted to increase the proportion of the liquids from the bottom of absorber tower 17 (stream 45) that are heated in heat exchanger 10 and supplied to stripper tower 19 at a mid-column feed point. The plant controls have also been adjusted to raise the bottom temperature of stripper column 19 slightly (from 42° F. in the FIG. 3 process to 45° F. in the FIG. 4 process) to maintain the methane to ethane ratio in the bottom product at the specified 0.0237:1 molar ratio. The increased quantity of heated stream 45a entering stripper tower 19 and the higher bottoms temperature both increase the stripping inside the tower, which results in warmer temperatures for the FIG. 4 process relative to the FIG. 3 process throughout both absorber column 17 and stripper column 19, with the net effect of reducing the carbon dioxide content of the liquid product, stream 43, leaving stripper column 19. The warmer column temperatures also result in a slight reduction in the refrigeration that is available from the process streams to be applied to the column feed streams. In particular, this requires slightly reducing the proportion of the separator feed gas (stream 32) that is directed to heat exchanger 12 via stream 33, thereby reducing the quantity of stream 36b entering at the top feed point of absorber tower 17.

A summary of stream flow rates and energy consumption for the process illustrated in FIG. 4 is set forth in the following table:

TABLE IV (FIG. 4)
Stream Flow Summary - (Lb. Moles/Hr)

| Stream | Methane | Ethane | Propane | Butanes+ | C. Dioxide | Total |
|---|---|---|---|---|---|---|
| 31 | 121383 | 5218 | 1384 | 619 | 1054 | 131766 |
| 32 | 118612 | 4421 | 770 | 133 | 980 | 127009 |
| 35 | 2771 | 797 | 614 | 486 | 74 | 4757 |
| 33 | 21943 | 818 | 143 | 25 | 181 | 23497 |
| 34 | 96669 | 3603 | 627 | 108 | 799 | 103512 |
| 38 | 11442 | 4976 | 1362 | 616 | 616 | 19052 |
| 44 | 5721 | 2488 | 681 | 308 | 308 | 9527 |
| 45 | 5721 | 2488 | 681 | 308 | 308 | 9527 |
| 39 | 11337 | 561 | 21 | 1 | 338 | 12297 |
| 37 | 121278 | 803 | 43 | 4 | 776 | 125011 |
| 43 | 105 | 4415 | 1341 | 615 | 278 | 6755 |

Recoveries*

| | |
|---|---|
| Ethane | 84.61% |
| Propane | 96.96% |
| Butanes+ | 99.39% |
| Horsepower | |
| Residue Compression | 44,573 |

*(Based on un-rounded flow rates)

The carbon dioxide concentration in the ethane product for the FIG. 4 process is 5.80 mole percent, well below the specification required by the client. Comparison of the recovery levels displayed in Tables I and IV shows that the present invention allows achieving the required carbon dioxide content while maintaining almost the same liquids recovery efficiency as the FIG. 1 process. Although the ethane recovery decreases slightly from 84.89% to 84.61%, the propane recovery and the butanes+ recovery both increase slightly, from 96.90% to 96.96% and from 99.33% to 99.39%, respectively. Comparison of Tables I and IV further shows that maintaining the product yields was achieved using essentially the same horsepower (utility) requirements.

Comparison of the recovery levels displayed in Tables II and IV shows that the present invention allows achieving much higher liquids recovery efficiency than the FIG. 2 process when it is operated in a fashion to limit the carbon dioxide content of its liquid product. Compared to the FIG. 2 process, the FIG. 4 process raises the ethane recovery from 68.94% to 84.61%, almost 15.7 percentage points higher. The propane recovery and the butanes+ recovery also increase somewhat, from 96.61% to 96.96% and from 99.25% to 99.39%, respectively. Comparison of Tables II and IV further shows that the higher the product yields were not simply the result of increasing the horsepower (utility) requirements. To the contrary, when the present invention is employed as in Example 2, not only do the ethane, propane, and butanes+ recoveries increase over those of the prior art process, but liquid recovery efficiency also increases by 23 percent (in terms of ethane recovered per unit of horsepower expended).

As with the process of FIG. 3, a significant benefit achieved by the embodiment of FIG. 4 is that the modified reboiler scheme provides colder column liquids for use in refrigerating the incoming feed streams. This increases the cooling available to the inlet gas, as not only can considerably more duty be obtained from the liquid in this case, but at a colder temperature level. At the same time, more methane is introduced lower in stripper column 19 than would otherwise be there when reboiling the column to meet the carbon dioxide content. (Note that stream 45 in the FIG.

4 process contains 5721 Lb. Moles/Hr of methane and is introduced at theoretical stage 8 of stripper column 19, whereas stream 40 in the FIG. 2 process contains only 1886 Lb. Moles/Hr of methane and is introduced at the top of stripper column 19). The additional methane provided by the present invention in the FIG. 4 process helps to strip the carbon dioxide from the liquids flowing downward in the stripping column. The quantity of carbon dioxide in the NGL product can be adjusted by appropriate control of the quantity of liquid withdrawn to feed the modified reboiler system instead of feeding the top of the stripping column.

Other Embodiments

Figure 5:
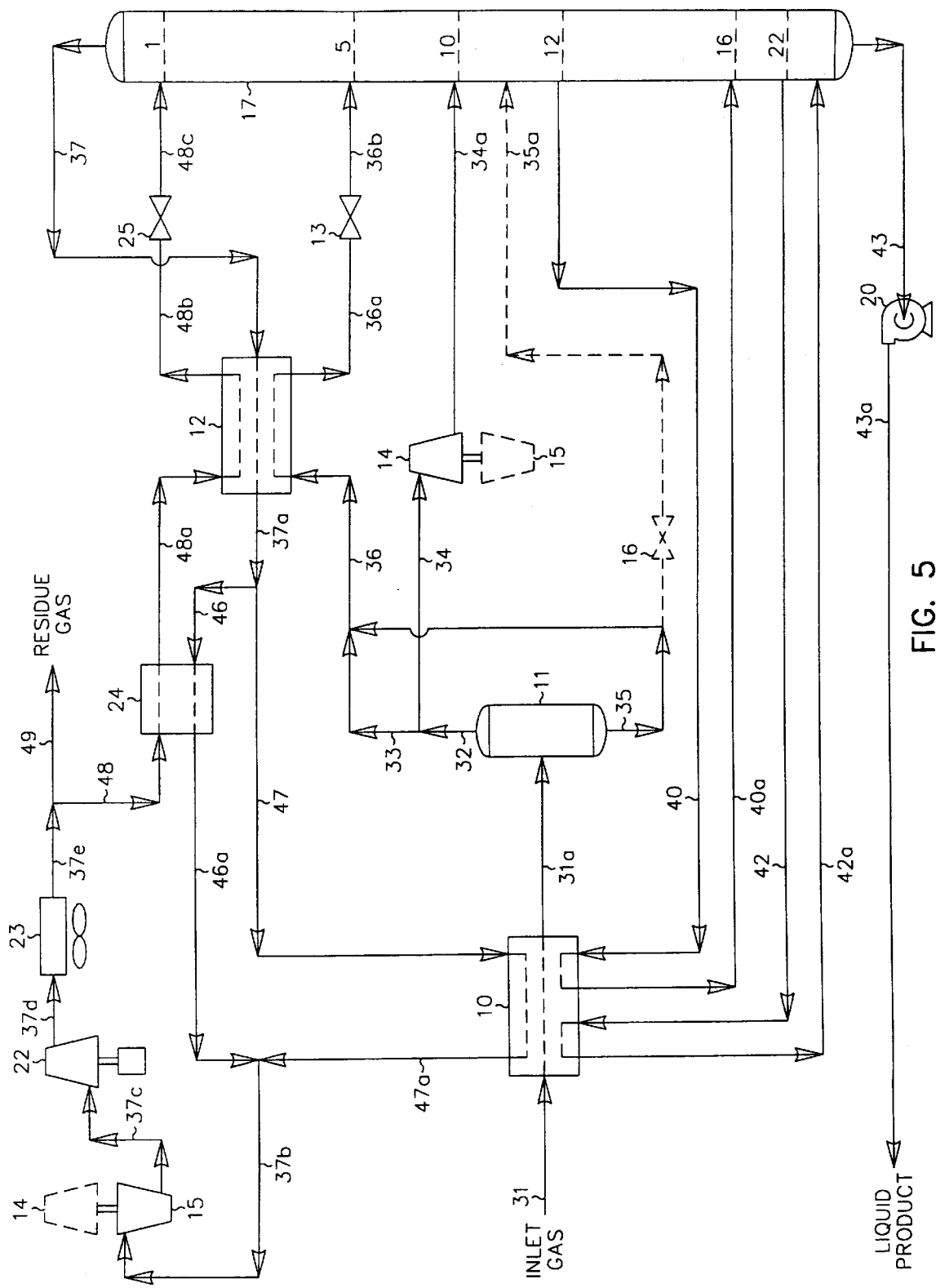
FIG. 5 is a flow diagram illustrating how an alternative prior art process can be adapted to be a natural gas processing plant in accordance with the present invention.
Figure 6:
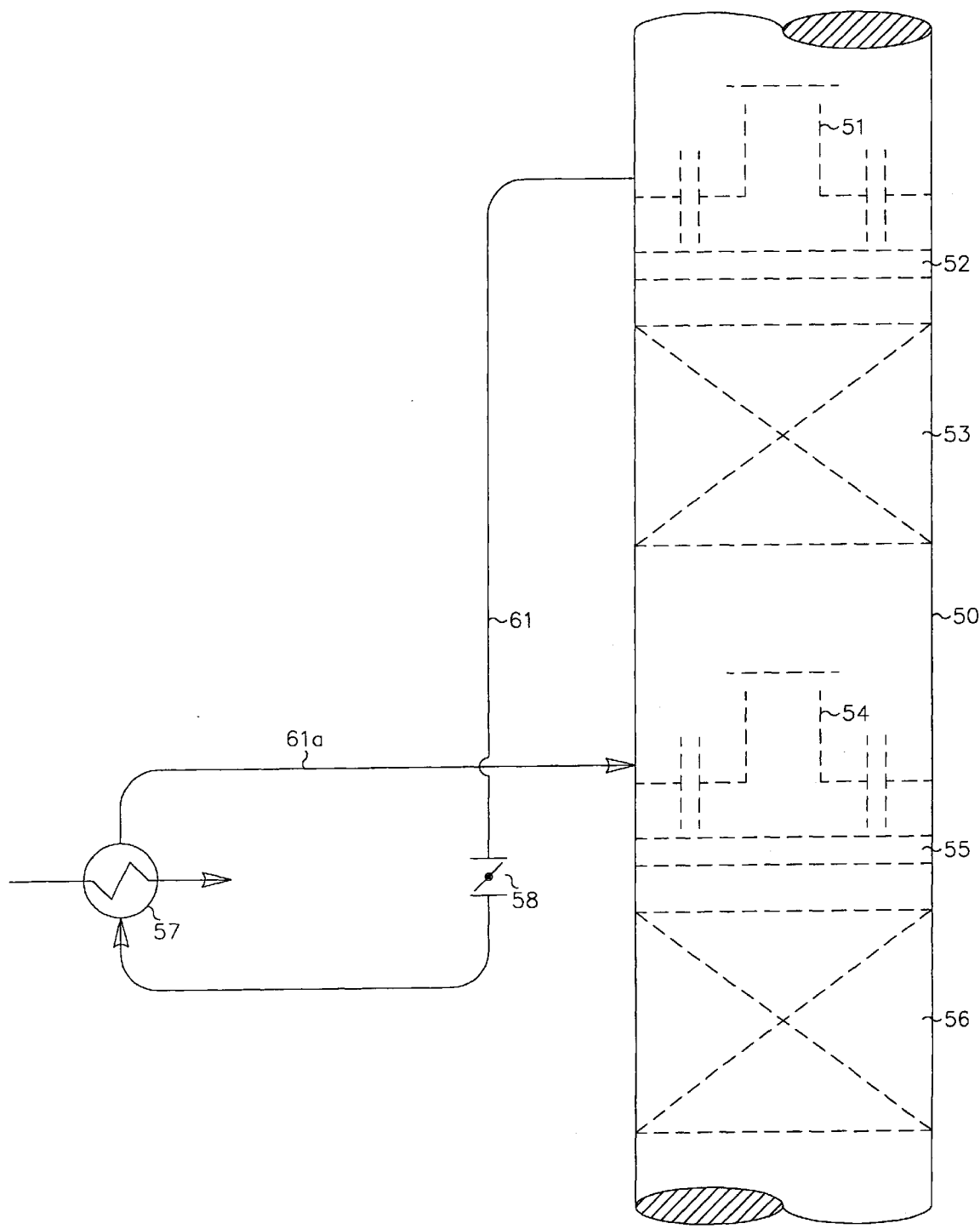
FIG. 6 is a diagram illustrating the modified reboiler scheme of the present invention for a processing plant wherein the scheme includes a thermnosiphon system.
Figure 7:
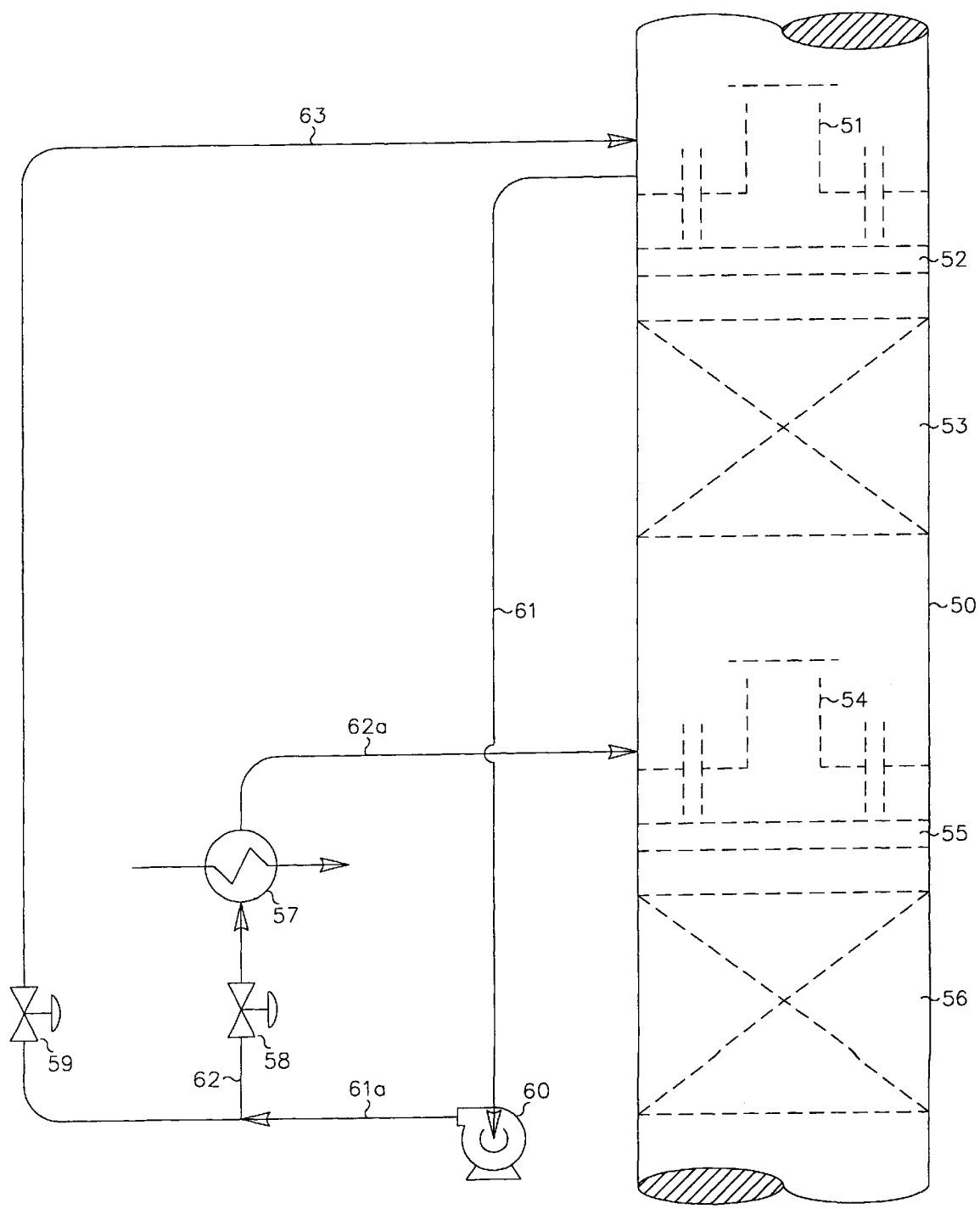
FIG. 7 is a diagram illustrating the modified reboiler scheme of the present invention for a processing plant wherein the scheme includes a pumped system.
Figure 8:
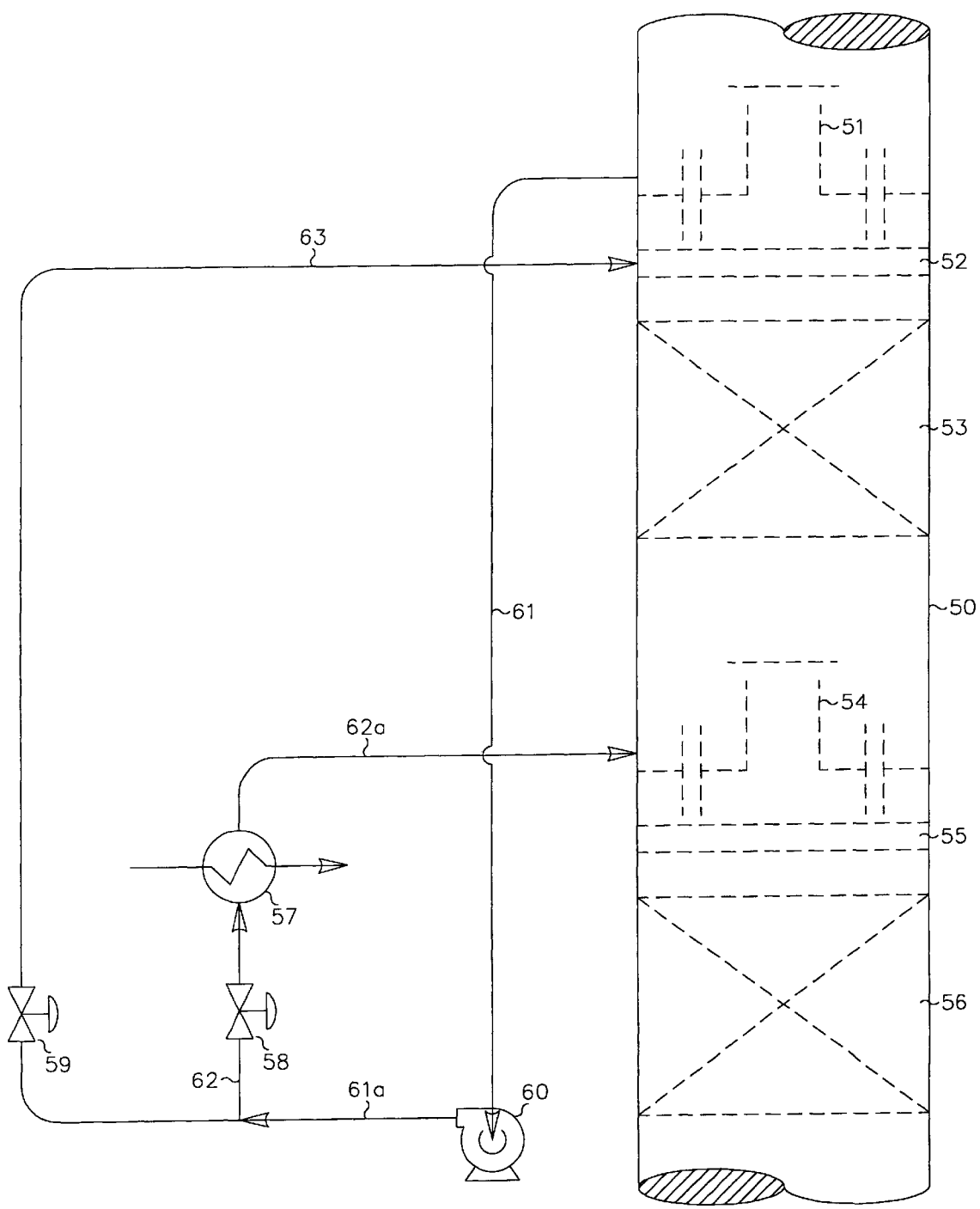
FIG. 8 is a diagram illustrating the modified reboiler scheme of the present invention for a processing plant wherein the scheme includes a pumped system.
Figure 9:
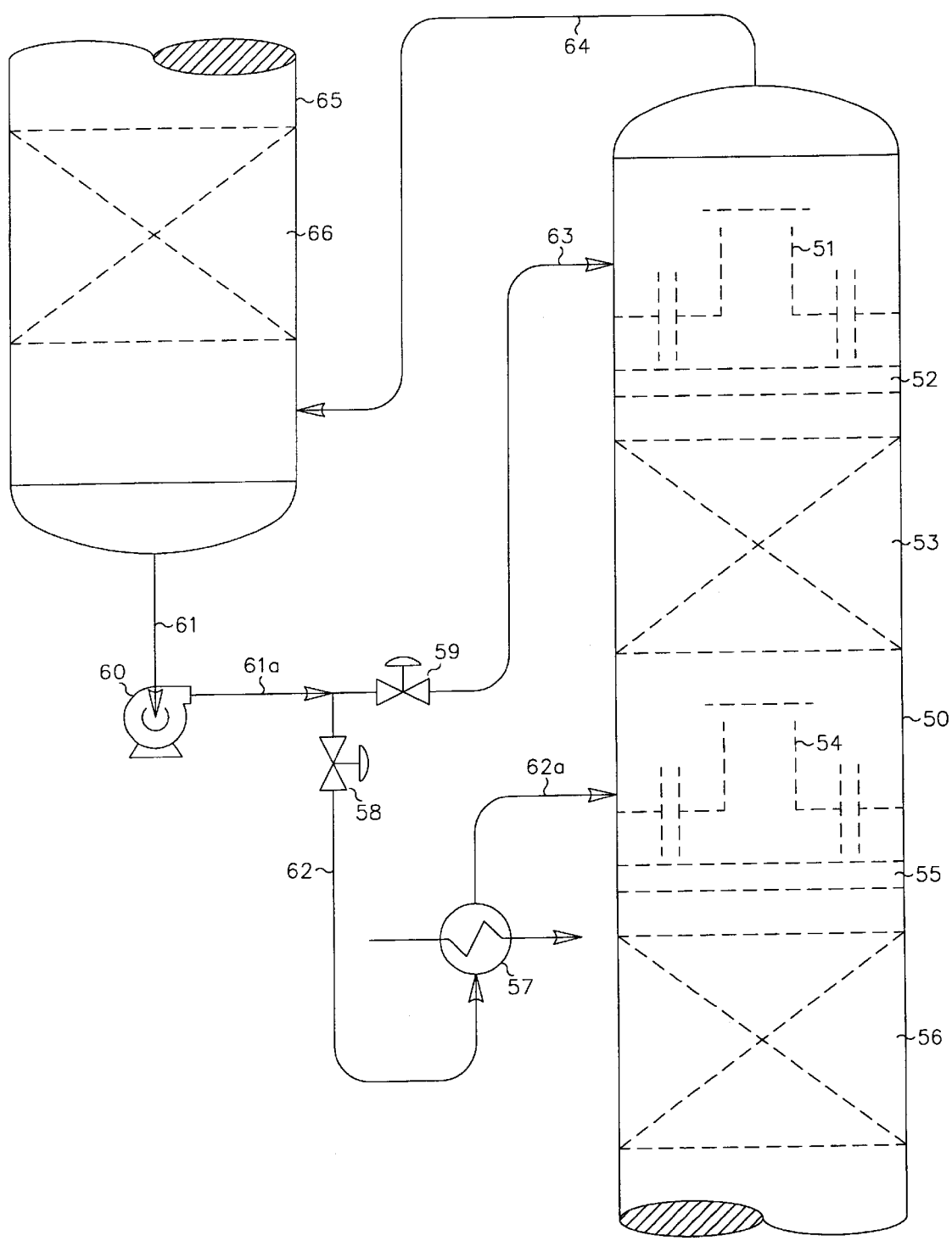
FIG. 9 is a diagram illustrating the modified reboiler scheme of the present invention for a processing plant wherein the scheme includes a split column system.

FIG. 5 is a flow diagram illustrating how the process and apparatus described and depicted in U.S. Pat. No. 5,568,737 can be adapted to be a natural gas processing plant in accordance with the present invention. FIGS. 6, 7, 8, and 9 are diagrams showing some of the alternative methods for implementing the modified reboiler scheme. FIG. 6 shows a typical thermosiphon type application wherein the partial flow of liquid from fractionation tower 50 to reboiler 57 could be controlled via valve 58 in liquid draw line 61. The liquid portion not withdrawn from the column simply overflows chimney tray 51 onto distributor 52 for packing (or trays) 53 below. The heated stream in line 61a from reboiler 57 is returned to fractionation tower 50 at a lower point which contains an appropriate feed distribution mechanism, such as chimney tray 54 and distributor 55, to mix the heated stream with the down-flowing tower liquids from packing 53 and supply the mixture to packing (or trays) 56. FIGS. 7 and 8 show typical pumped adaptations wherein the total liquid down-flow is withdrawn in liquid draw line 61 and pumped to higher pressure by pump 60. The flow of the pumped liquid in line 61a is then divided via appropriate control valves 58 and 59 to arrive at the desired quantity of liquid in line 62 flowing to reboiler 57. The heated stream in line 62a from reboiler 57 is returned to fractionation tower 50 at a lower point as described previously for the FIG. 6 embodiment. In the FIG. 7 embodiment, the liquid that does not flow to the reboiler (in line 63) is returned to chimney tray 51 from which the liquid was initially withdrawn, whereupon it can overflow chimney tray 51 onto distributor 52 for packing (or trays) 53 below. In the FIG. 8 embodiment, the liquid that does not flow to the reboiler (in line 63) is returned below chimney tray 51 from which the liquid was initially withdrawn, directly to distributor 52 that supplies the liquid to packing (or trays) 53 below. FIG. 9 shows how the pumped system described for FIG. 8 can be implemented in a split column approach, such as upper column 65 and lower column 50, which is the same as that used in FIGS. 3 and 4.

One skilled in the art will recognize that the present invention gains some of its benefit by providing a colder stream to the side reboiler(s) and/or reboiler(s), allowing additional cooling of the column feed or feeds. This additional cooling reduces utility requirements for a given product recovery level, or improves product recovery levels for a given utility consumption, or some combination thereof. Further, one skilled in the art will recognize that the present invention also benefits by introducing greater quantities of methane lower in the demethanizer to assist in stripping carbon dioxide from the down-flowing liquids. With more methane available for stripping the liquids, correspondingly less ethane is needed for stripping, allowing more retention of ethane in the bottom liquid product. Therefore, the present invention is generally applicable to any process dependent on cooling any number of feed streams and supplying the resulting feed stream(s) to the column for distillation.

In accordance with this invention, the cooling of the demethanizer feed streams may be accomplished in many ways. In the process of FIGS. 3 and 4, feed stream 36 is cooled and substantially condensed by the demethanizer overhead vapor stream 37, while the demethanizer liquids (streams 45, 41, and 42) are used only for gas stream cooling. In the process of FIG. 5, high pressure residue feed stream 48 is also cooled and substantially condensed by portions of the distillation column overhead vapor stream (streams 46 and 37), while the demethanizer liquids (streams 40 and 42) are used only for gas stream cooling. However, demethanizer liquids could be used to supply some or all of the cooling and substantial condensation of stream 36 in FIGS. 3 through 5 and/or stream 48 in FIG. 5 in addition to or instead of gas stream cooling. Further, any stream at a temperature colder than the feed stream being cooled may be utilized. For instance, a side draw of vapor from the demethanizer could be withdrawn and used for cooling. Other potential sources of cooling include, but are not limited to, flashed high pressure separator liquids and mechanical refrigeration systems. The selection of a source of cooling will depend on a number of factors including, but not limited to, inlet gas composition and conditions, plant size, heat exchanger size, potential cooling source temperature, etc. One skilled in the art will also recognize that any combination of the above cooling sources or methods of cooling may be employed in combination to achieve the desired feed stream temperature(s).

In accordance with this invention, the use of external refrigeration to supplement the cooling available to the inlet gas from other process streams may be employed, particularly in the case of an inlet gas richer than that used in Examples 1 and 2. The use and distribution of demethanizer liquids for process heat exchange, and the particular arrangement of heat exchangers for inlet gas cooling must be evaluated for each particular application, as well as the choice of process streams for specific heat exchange services.

The high pressure liquid in FIGS. 3 through 5 (stream 35) need not all be combined with the portion of the separator vapor (stream 33) flowing to heat exchanger 12. Alternatively, this liquid stream (or a portion thereof) may be expanded through an appropriate expansion device, such as expansion valve 16, and fed to a lower mid-column feed point on the distillation column (absorber tower 17 or stripper tower 19 in FIGS. 3 and 4, fractionation tower 17 in FIG. 5). The liquid stream may also be used for inlet gas cooling or other heat exchange service before or after the expansion step prior to flowing to the demethanizer.

It will also be recognized that the relative amount of feed found in each branch of the column feed streams will depend on several factors, including gas pressure, feed gas composition, the amount of heat which can economically be extracted from the feed and the quantity of horsepower available. More feed to the top of the column may increase recovery while decreasing power recovered from the expansion machine thereby increasing the recompression horsepower requirements. Increasing feed lower in the column reduces the horsepower consumption but may also reduce product recovery. The mid-column feed positions depicted in FIGS. 3 and 4 are the preferred feed locations for the process operating conditions described. However, the relative locations of the mid-column feeds may vary depending on inlet composition or other factors such as desired recovery levels and amount of liquid formed during inlet gas cooling. Moreover, two or more of the feed streams, or portions thereof, may be combined depending on the relative temperatures and quantities of individual streams, and the combined stream then fed to a mid-column feed position. FIGS. 3 and 4 are the preferred embodiment for the compositions and pressure conditions shown. Although individual stream expansion is depicted in particular expansion devices, alternative expansion means may be employed where appropriate. For example, conditions may warrant work expansion of the substantially condensed portion of the feed stream (36a in FIGS. 3 through 5) or the substantially condensed recycle stream (48b in FIG. 5).

FIGS. 3 and 4 depict a fractionation tower constructed in two sections (17 and 19) because of the size of the plant. The decision whether to construct the fractionation tower as a single vessel (such as 17 in FIG. 5) or multiple vessels will depend on a number of factors such as plant size, the distance to fabrication facilities, etc.

While there have been described what are believed to be preferred embodiments of the invention, those skilled in the art will recognize that other and further modifications may be made thereto, e.g. to adapt the invention to various conditions, types of feed, or other requirements, without departing from the spirit of the present invention as defined by the following claims.

We claim:

1. In a process for the separation of a gas stream containing methane, $C_2$ components, $C_3$ components and heavier hydrocarbon components into a volatile residue gas fraction containing a major portion of said methane and a relatively less volatile fraction containing a major portion of said $C_2$ components, $C_3$ components and heavier hydrocarbon components, in which process
    (a) said gas stream is treated in one or more heat exchange steps and at least one division step to produce at least a first feed stream that has been cooled under pressure to condense substantially all of it, and at least a second feed stream that has been cooled under pressure;
    (b) said substantially condensed first feed stream is expanded to a lower pressure whereby it is further cooled, and thereafter supplied to a fractionation tower at a top feed point;
    (c) said cooled second feed stream is expanded to said lower pressure, and thereafter supplied to said fractionation tower at a mid-column feed point; and
    (d) said cooled expanded first feed stream and said expanded second feed stream are fractionated at said lower pressure whereby the components of said relatively less volatile fraction are recovered;
    the improvement wherein
        (1) a liquid distillation stream is withdrawn from said fractionation tower and heated;
        (2) said heated distillation stream is returned to a lower point on said fractionation tower that is separated from said withdrawal point by at least one theoretical stage; and
        (3) the quantities and temperatures of said feed streams to said fractionation tower are effective to maintain the overhead temperature of said fractionation tower at a temperature whereby the major portions of the components in said relatively less volatile fraction are recovered.

2. In a process for the separation of a gas stream containing methane, $C_2$ components, $C_3$ components and heavier hydrocarbon components into a volatile residue gas fraction containing a major portion of said methane and a relatively less volatile fraction containing a major portion of said $C_2$ components, $C_3$ components and heavier hydrocarbon components, in which process
    (a) said volatile residue gas fraction is re-compressed and a portion is withdrawn to form a compressed first feed stream;
    (b) said compressed first feed stream is cooled under pressure to condense substantially all of it;
    (c) said substantially condensed first feed stream is expanded to a lower pressure whereby it is further cooled, and thereafter supplied to a fractionation tower at a top feed point;
    (d) said gas stream is treated in one or more heat exchange steps to produce at least a second feed stream that has been cooled under pressure;
    (e) said cooled second feed stream is expanded to said lower pressure, and thereafter supplied to said fractionation tower at a mid-column feed point; and
    (f) said cooled expanded first feed stream and said expanded second feed stream are fractionated at said lower pressure whereby the components of said relatively less volatile fraction are recovered;
    the improvement wherein
        (1) a liquid distillation stream is withdrawn from said fractionation tower and heated;
        (2) said heated distillation stream is returned to a lower point on said fractionation tower that is separated from said withdrawal point by at least one theoretical stage; and
        (3) the quantities and temperatures of said feed streams to said fractionation tower are effective to maintain the overhead temperature of said fractionation tower at a temperature whereby the major portions of the components in said relatively less volatile fraction are recovered.

3. The improvement according to claims 1 or 2 wherein said liquid distillation stream is pumped after being withdrawn from said fractionation tower.

4. The improvement according to claim 3 wherein
    (a) said pumped liquid distillation stream is divided into at least a first portion and a second portion;
    (b) said first portion is heated; and
    (c) said heated first portion is returned to a lower point on said fractionation tower that is separated from said withdrawal point by at least one theoretical stage.

5. The improvement to claim 4 wherein said first portion is directed in heat exchange relation with at least a portion of said gas stream or said feed stream, to supply said cooling thereto and thereby heat said first portion.

6. The improvement according to claim 4 wherein the quantity and temperature of said heated first portion and the heating supplied to said fractionation tower are effective to maintain the bottom temperature of said fractionation tower at a temperature to reduce the quantity of carbon dioxide contained in said relatively less volatile fraction.

7. The improvement according to claim 5 wherein the quantity and temperature of said heated first portion and the heating supplied to said fractionation tower are effective to maintain the bottom temperature of said fractionation tower at a temperature to reduce the quantity of carbon dioxide contained in said relatively less volatile fraction.

8. The improvement according to claim 3 wherein said pumped liquid distillation stream is directed in heat exchange relation with at least a portion of said gas stream or said feed streams, to supply said cooling thereto and thereby heat said pumped liquid distillation stream.

9. The improvement according to claim 8 wherein the quantity and temperature of said heated distillation stream and the heating supplied to said fractionation tower are effective to maintain the bottom temperature of said fractionation tower at a temperature to reduce the quantity of carbon dioxide contained in said relatively less volatile fraction.

10. The improvement according to claim 3 wherein the quantity and temperature of said heated distillation stream and the heating supplied to said fractionation tower are effective to maintain the bottom temperature of said fractionation tower at a temperature to reduce the quantity of carbon dioxide contained in said relatively less volatile fraction.

11. The improvement according to claims 1 or 2 wherein said liquid distillation stream is directed in heat exchange relation with at least a portion of said gas stream or said feed streams, to supply said cooling thereto and thereby heat said liquid distillation stream.

12. The improvement according to claim 11 wherein the quantity and temperature of said heated distillation stream and the heating supplied to said fractionation tower are effective to maintain the bottom temperature of said fractionation tower at a temperature to reduce the quantity of carbon dioxide contained in said relatively less volatile fraction.

13. The improvement according to claims 1 or 2 wherein the quantity and temperature of said heated distillation stream and the heating supplied to said fractionation tower are effective to maintain the bottom temperature of said fractionation tower at a temperature to reduce the quantity of carbon dioxide contained in said relatively less volatile fraction.

* * * * *

UNITED STATES PATENT AND TRADEMARK OFFICE
CERTIFICATE OF CORRECTION

PATENT NO.   : 6,182,469 B1
DATED        : February 6, 2001
INVENTOR(S)  : Campbell et al.

It is certified that error appears in the above-identified patent and that said Letters Patent is hereby corrected as shown below:

<u>Column 4,</u>
Line 23, "thermnosiphon" should read -- thermosiphon --.

<u>Column 16,</u>
Line 46, "feed stream" should read -- feed streams --.

Signed and Sealed this

Eleventh Day of June, 2002

Attest:

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO.    : 6,182,469 B1
DATED         : February 6, 2001
INVENTOR(S)   : Campbell et al.

It is certified that error appears in the above-identified patent and that said Letters Patent is hereby corrected as shown below:

<u>Column 4,</u>
Line 3, "thermnosiphon" should read -- thermosiphon --.

<u>Column 16,</u>
Line 46, "feed stream" should read -- feed streams --.

This certificate supersedes Certificate of Correction issued June 11, 2002

Signed and Sealed this

Twelfth Day of November, 2002

*Attest:*

*Attesting Officer*

JAMES E. ROGAN
*Director of the United States Patent and Trademark Office*